H. A. LEE.
VALVE STEM PACKING CUP.
APPLICATION FILED MAY 23, 1919.
1,344,347. Patented June 22, 1920.
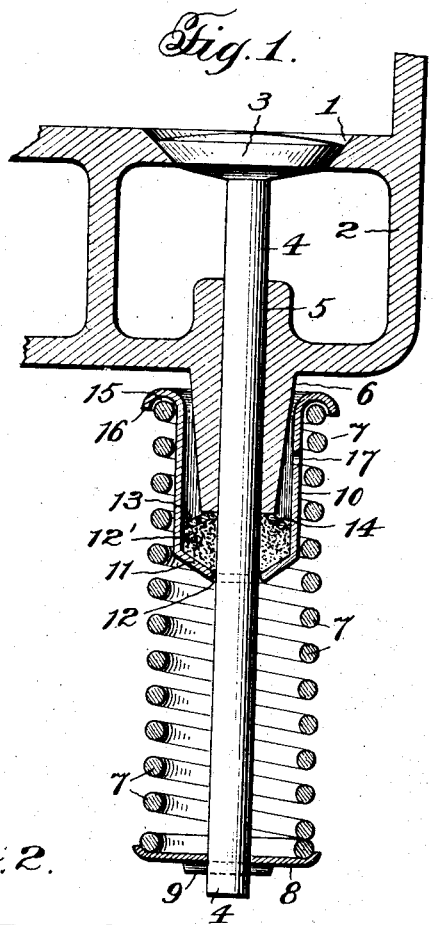
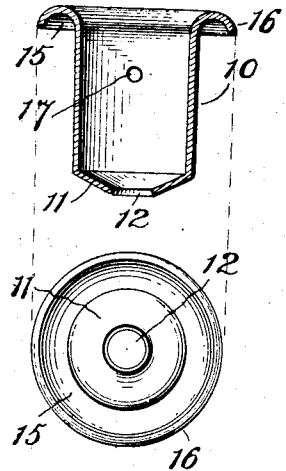
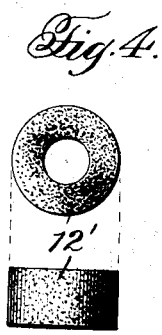
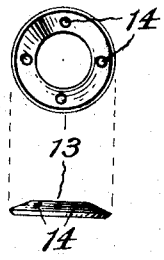
Inventor:
Harry A. Lee,
By Milans & Milans
Attorneys
Witness:
Jas Es Hutchinson

UNITED STATES PATENT OFFICE.

HARRY ARTHUR LEE, OF KANSAS CITY, MISSOURI.

VALVE-STEM PACKING-CUP.

1,344,347. Specification of Letters Patent. Patented June 22, 1920.

Application filed May 23, 1919. Serial No. 299,087.

*To all whom it may concern:*

Be it known that I, HARRY A. LEE, a citizen of the United States, residing at Kansas City, in the county of Jackson and State of Missouri, have invented certain new and useful Improvements in Valve-Stem Packing-Cups, of which the following is a specification, reference being had therein to the accompanying drawing.

The invention relates to improvements in valve stem packing cups, primarily intended for application to internal combustion engine valves.

In the use of internal combustion engines it frequently happens that air leaks exist between the valve stem and the walls of the opening in the chest through which the stem passes, usually caused by a wearing of the stem or an improper fitting thereof, and it has been found that when such a leak exists air is introduced to the combustible mixture in the cylinder upon a suction stroke of the piston, thereby interfering with the proper carbureter adjustment. Upon the exhaust stroke of the piston burned gases from the cylinder pass around the stem carrying carbon deposits which at times adhere to the valve stem and cause sticking thereof, as well as allowing these exhaust gases to escape from the engine and offer a disagreeable odor to anyone who happens to be in a position close to the engine.

It is an object of this invention to provide a valve stem packing adapted to surround the valve stem and prevent admission of air to the cylinders around the stem during a suction stroke of the piston, or a discharge of the exhaust gases from the cylinder around said stem during a power stroke thereof.

It is a further object of the invention to provide an attachment of this character which can readily be applied to engines now in use, and one that is simple in construction, inexpensive to manufacture yet highly efficient in operation.

A further object of the invention is to provide a packing cup for valve stems adapted to receive a suitable packing and serving to completely seal the space between the stem and its guide and constituting an oil reservoir to receive and supply a lubricant to the valve stem during its reciprocation.

The invention also comprehends a packing cup of this character in which the cup containing the packing has its upper edge spaced from the lower wall of the valve casing and normally urged upwardly by a spring which in turn forces the packing in a sealing position so as to take up any wear of the packing and always maintain the same in a sealing relation with the valve stem and its guide.

More specifically the invention comprehends a suitable packing cup which is of a material height adapted to carry a packing disposed therein to surround a valve stem, the cup being provided with a flange extending outwardly therefrom to receive and be supported by the valve spring to maintain the packing in a sealing position. It will be observed that the walls of the packing are of considerable length and the invention contemplates the provision of an oil opening therein through which oil may be introduced into the cup so that the same constitutes an oil reservoir for lubricating the reciprocating valve stem around which the packing is disposed.

In the accompanying drawings I have illustrated and described the preferred embodiment of my invention but it will, of course, be understood that many changes may be made without departing from the spirit thereof.

In the drawings:

Figure 1 is a cross sectional view with parts in section.

Figs. 2, 3 and 4 are detail views.

Referring now more particularly to the drawings wherein like reference characters indicate corresponding parts, the numeral 1 designates a valve seat adapted to be surrounded by the usual valve chamber 2, the wall of the cylinder and the chamber being broken away in the accompanying drawings. Seated upon the valve seat 1 is the usual valve 3 having a stem 4 passing through an opening 5 in the valve chamber 2 formed with an elongated extension or guide portion 6 extending beyond the exterior thereof but obviously any form of opening and guide may be used in keeping with the type of engine employed.

The valve is normally maintained in a closed position by the action of the resilient coiled spring 7 seated upon a plate 8 at one end held against movement upon the stem 4 by the pin 9 passing transversely through the stem, while the opposite end of the spring bears against and is supported by the valve packing cup 10 constituting the subject matter of this invention and of a structure to be now described.

In the use of internal combustion engines it frequently happens that continual reciprocation of the valve stems causes a wearing away of the surfaces thereof, or these stems are improperly fitted so as to provide a space between the stem and the walls of the opening in the valve chamber whereby a quantity of air is drawn into the cylinder upon a suction stroke of the engine causing a complete disturbance of the carbureter adjustment of the engine by allowing an excess quantity of air to intermix with the explosive charge therein, thereby producing what is commonly termed a lean mixture which is highly objectionable to the successful operation of the engine. On the firing stroke of the piston when such a leakage as this occurs burned gases from the cylinder are forced through the space between the surface of the valve stem and walls of the opening of the valve chamber through which said stem passes, resulting in a deposit of carbon upon the valve stem, frequently causing a sticking thereof and the discharge of gases having a very obnoxious odor into the atmosphere which is highly objectionable to the user of the engine, especially where the same is being employed for driving an automobile.

To overcome these serious objections the packing cup 10 is of a substantially hollow formation having a bottom wall 11 of a downwardly tapering formation provided with a valve stem opening 12 whereby the cup may receive the valve stem when applied thereto. The bottom wall 11 of the cup receives a packing 12 which may be of rubber, felt, of any other well known packing material adapted to have positioned thereon an annular substantially concave collar 13 provided with a central opening materially greater than the diameter of the valve stem and formed with a plurality of apertures 14 therein for a purpose which will later appear.

The packing cup with its packing is inserted upon a valve stem and the upper surface of the packing is forced against the lower edge of the valve stem guide 6 by means of the valve spring 7, the upper end of the spring being received within a pocket 15 formed by curving outwardly and then downwardly the end portion of the cup as indicated by the reference character 16. The pocket thus formed is of a substantially circular formation and is fashioned to receive the end of the coiled spring and serves to center the same and constitute a stop or support for the upper end of this spring. It will be observed that the upper end of the packing 16 is spaced from the lower surface of the valve chamber 2 and it is, of course, apparent that the spring 7 normally urges the packing cup 10 upwardly, thereby holding the packing 12 seated therein in a sealing relation with the valve stem and the lower edge of the guide 6 to prevent the introduction or exit of the fluid around the stem. During the operation of the valves the packing will be subjected to some wear and by placing the upper edge of the packing cup over the lower surface of the wall of the valve chamber this wear is taken up by the action of the spring tending to normally raise the packing cup and thereby always maintain the packing disposed therein in a sealing relation with the stem and its guide and oil permitted to slowly pass to the packing through the openings 14.

Valve stems of this character are subject to considerable wear and to the end that their life be materially prolonged, the packing cup has disposed therein at a point well above its bottom a suitable oil hole 17 through which a lubricant is introduced to the interior of the cup and applied to the valve stem by the relatively absorbent packing 12'. The cup by having relatively long walls constitutes a reservoir for the lubricant and the lubricant thus held therein is permitted to pass to the packing through the apertures 14 in the collar 13 and is continually applied to the valve stem, increasing the life of the stem and also preventing a rapid wearing of the packing. It will also be observed that by inclining the bottom 11 of the packing cup when the packing seated therein is placed under compression by the tension of the spring 7 that the same is urged tightly into contact with the stem so as to provide a very efficient sealing between the stem and its guide and preventing any possible chance of an opening being formed between said stem and its guide through which air may pass, the packing being always held in a sealing position by the agency of the spring acting upon the cup 10 which in turn normally urges the packing into contact with the stem and its guide. The collar 14 serves materially to prevent a distortion of the packing, yet the diameter of the opening therein is sufficient to permit a material portion of the upper surface of the packing to contact with the lower edge of the valve stem guide 6 to provide an effective closure for any space that may exist between the valve stem 4 and its guide.

While I have shown and described the preferred embodiment of my invention it will, of course, be understood that the same is subject to many changes and modifications without departing from the spirit of the appended claims.

Having thus described the invention, what I claim is:

1. In a packing for valve stems for engines, a valve having a suitable stem and a guide therefor, a packing cup adapted to receive a packing and apertured for the passage of the stem, said cup at its upper end having an offset portion provided with a downwardly directed end forming a space between said end and the wall of the cup, and a resilient member for normally urging said packing into sealing relation with the guide disposed within the space formed by the offset collar of said cup, and a perforated conical member disposed within the cup upon said packing.

2. In a packing for valve stems of an internal combustion engine, a packing material disposed around the stem and bearing against a guiding means therefor, a metallic cup adapted to receive said packing and formed to constitute an oil reservoir, a perforated washer seated upon said packing and allowing oil to pass through the perforations therein to the packing to lubricate said stem, and means for normally holding said packing in sealing relation with the guiding means.

3. In a packing for valve stems, a valve and a valve stem therefor, a guide for said stem, a packing cup having an inclined bottom provided with an opening through which the valve stem passes, a packing received in the cup and supported on the inclined bottom around the stem, a concavo-convex collar surrounding the valve stem, and received in the cup with its concave face bearing on the packing, and means for forcing the cup upwardly so that the convex face of the collar engages the end of the valve stem guide for compressing the packing around the stem.

In testimony whereof I hereunto affix my signature in the presence of two witnesses.

HARRY ARTHUR LEE.

Witnesses:
　THOS. M. RAGAN,
　ARTHUR WM. GEBAUR.